United States Patent [19]

Haig

[11] Patent Number: 5,324,142
[45] Date of Patent: Jun. 28, 1994

[54] TWO-ROTOR POWDER DISPENSING APPARATUS

[76] Inventor: Frederick Haig, 123 Bamfield Road, Heidelberg Heights 3081, Victoria, Australia

[21] Appl. No.: 855,029
[22] PCT Filed: Nov. 5, 1990
[86] PCT No.: PCT/AU90/00532
  § 371 Date: Jul. 6, 1992
  § 102(e) Date: Jul. 6, 1992
[87] PCT Pub. No.: WO91/06495
  PCT Pub. Date: May 16, 1991

[30] Foreign Application Priority Data
  Nov. 6, 1989 [AU] Australia ................ PJ7231
  Aug. 17, 1990 [AU] Australia ................ PK1810

[51] Int. Cl.⁵ ............................. B65G 53/46
[52] U.S. Cl. ............................. 406/66; 406/67
[58] Field of Search ................ 406/63, 66, 67

[56] References Cited

U.S. PATENT DOCUMENTS

| 1,207,832 | 12/1916 | Allington | 406/66 |
| 1,764,998 | 6/1930 | Bailey | 406/66 |
| 1,772,290 | 8/1930 | Rosencrants | 406/66 |
| 2,314,031 | 3/1943 | Colburn | 406/63 |
| 3,076,580 | 2/1963 | Heath | 406/63 |
| 3,161,442 | 12/1964 | Reed | 406/63 |
| 4,376,600 | 3/1983 | Egli | 406/63 |
| 4,681,484 | 7/1987 | Egger | 406/63 |
| 4,747,524 | 5/1988 | Krambrock | 406/66 X |
| 4,808,042 | 2/1989 | Muehlberger et al. | 406/66 |

FOREIGN PATENT DOCUMENTS

| 1073388 | 1/1960 | Fed. Rep. of Germany . | |
| 130849 | 5/1978 | Fed. Rep. of Germany | 406/63 |
| 380026 | 8/1964 | Switzerland . | |
| 517255 | 1/1940 | United Kingdom | 406/63 |
| 9003118 | 4/1990 | World Int. Prop. O. . | |
| 9106495 | 5/1991 | World Int. Prop. O. | 406/63 |

OTHER PUBLICATIONS

Patent Abstracts of Japan, M-254, p. 41, JP, A. 58-135030, (Sankou Kiuki Souchi K.K.) Aug. 11, 1983.

Primary Examiner—David M. Mitchell
Assistant Examiner—Andrew C. Pike
Attorney, Agent, or Firm—Cushman, Darby & Cushman

[57] ABSTRACT

An apparatus for the entraining of powdery materials in a gas stream consists essentially of two sets of rotatable horizontal vanes disposed vertically of each other and separated by a horizontal partition. Powdery material arriving at the upper set of vanes is pushed around to a communication conduit in the partition through which it falls to the lower set of vanes. These move the material around to an exit conduit whose cross section does not overlap with that of the communication conduit when the apparatus is viewed in plan. The material falls into the exit conduit to be entrained in a gas stream. Preferably the gas stream enters the apparatus adjacent to the exit conduit.

7 Claims, 2 Drawing Sheets

5,324,142

TWO-ROTOR POWDER DISPENSING APPARATUS

This invention relates to dispensing apparatus and more particularly to dispensing apparatus for use in dispensing powdery materials which are to be entrained in a gas stream.

The dispensing of powdery materials from a storage container for entrainment in a gas stream, for example, for spraying on to a substrate, can generally be achieved by simple techniques which are well known to the art. For example, in the field of powder coatings where the powder is to be applied by spraying, the powder is stored in a hopper and the contents are made flowable or fluidized by means of air which enters the hopper at its base and forces its way up through the mass of powder. When conditions are optimized, the powder will behave as a fluid which can then be pumped from the hopper by any convenient means. Any tendency of the powdery materials to stick together and not fluidize efficiently can be overcome by using dry fluidizing gases.

This method works well for powdery materials which are not especially hygroscopic (most coating powders fall into this category) but not so well for materials which are appreciably hygroscopic. A recent example of such a powder is sodium diacetate which is proposed to be sprayed on to non-frozen meat to preserve it- this is described in pending PCT published application WO 90/03118. The dispensing apparatus described hereinabove for use with powder coating does not work efficiently when hygroscopic materials are used. The prior art on the handling of hygroscopic materials is varied. It includes such apparatus as that of SU 961745 wherein there is described the use of a series of stirring vanes rotating in a horizontal plane in conjunction with an upward flow of drying air, and that of AU-A-4591/78 wherein a hopper containing hygroscopic material is constantly jarred to stop the material sticking together and to the walls of the hopper. However, neither of these solve the problem posed by the new technology of WO 90/03118, and a need exists for a simple apparatus which can be used without the need for dry gas or other facilities not normally present at meat works.

There has now been devised an apparatus for dispensing powdery materials which is especially useful in the dispensing of hygroscopic materials. There is therefore provided, according to the present invention, an apparatus adapted to dispense powdery materials such that they may be entrained in a gas stream, the apparatus comprising the following elements in combination:

(a) a receiving member for powdery material;

(b) at the bottom of this member, a container having two sets of vanes which are rotatable in a substantially horizontal plane about substantially vertical axes and which sets of vanes are arranged such that they are vertically disposed of each other, such that they are separated from each other by a horizontal partition and such that the areas swept by the two sets at least partially overlap when viewed in plan, the powdery material passing from the upper of the two sets of vanes to the lower set by means of at least one communication conduit in the horizontal partition whose total cross-sectional area lies substantially within the area swept by the upper set and is at most one quarter of that swept area; and (c) beneath the lower set of vanes, a floor having at least one exit conduit through which the powdery material leaves the container, the total surface area of the exit conduit lying completely within the area swept by the lower set and being at most one quarter of that swept area, the exit conduit being so positioned in relation to the communication conduit that, when viewed in plan, there is no overlap of the cross-sectional areas thereof.

The receiving member may be any suitable member. Typically, it is a simple hopper of the type used for powder coatings, modified at the lower end to interface with the upper set of the two sets of vanes.

The container which is below this member has two sets of vanes which are vertically displaced from each other and are rotatable in a substantially horizontal plane about substantially vertical axes. Preferably the two sets of vanes share a common axis and more preferably they are rigidly mounted on a common shaft. The two sets of vanes sweep circular areas which must at least partially overlap when viewed in plan, but preferably overlap of one by the other is complete, and in the simplest case the sets of vanes are coaxial and of identical size.

The two sets of vanes are separated by a horizontal partition, the only communication possible between them being via at least one communication conduit. The upper set of vanes pushes the powdery material to the communication conduit through which it falls to the lower set of vanes. This communication conduit may be any convenient means which allows the powdery material to pass from the upper set of vanes to the lower set. It may be, for example, simply a hole or a re-entrant portion in a stationary separating plate which otherwise completely separates the two sets of vanes. It may also be a tube which has its commencement at the point where the powdery material leaves the upper vanes. The total cross-sectional area of the communication conduit or conduits (there may be more than one) should not exceed one-quarter of the total area swept by the upper set of vanes and it should lie substantially within that swept area. By "substantially" is meant that there may be small and insignificant areas which are unswept. For example, in the case where the conduit is provided by a re-entrant portion in a plate, the vanes, having to have some clearance in order to rotate, cannot possibly sweep the entire area, but the unswept area is insignificant.

The powdery material falls through to the lower set of vanes which push the material round to an exit conduit (again, there may be more than one) in a floor beneath the vanes. As is the case with the communication conduit, the total cross-sectional area of the exit conduit should not exceed one-quarter of the area swept by the lower set of vanes and should fall substantially within the swept area. It is a requirement of this invention that there should be no overlap of the areas of the conduits when viewed in plan. In a preferred embodiment, the entrance to the exit conduit is positioned on a line passing through both the axis of rotation of the lower set of vanes, and the perpendicular projection of the communication conduit on to a plane of the exit conduit.

The powdery material, having been moved to the exit conduit, may now be entrained in a gas (usually air) stream. This may be achieved by any convenient method. For example, the exit conduit may run directly into a gas stream and be entrained. However, in a preferred embodiment of the invention, the gas stream enters prior to the powdery material leaving the second set of vanes via the exit conduit. In this embodiment, there is provided either between the upper and lower sets of vanes or at the lower set of vanes a vent through which gas can enter from the outside. This vent is positioned adjacent to the entrance to the exit conduit and gas is either blown in or drawn in by means of suction through the exit conduit. The powdery material arriving at the exit conduit is therefore immediately forced therein and entrained.

While the apparatus as hereinabove described is adequate for most hygroscopic materials, very hygroscopic materials may need some breaking up prior to their arriving at the upper set of vanes. This can be done in a number of ways. One way is to equip the apparatus with at least one stirring blade which rotates in the receiving member about the rotational axis of the upper set of vanes. A preferred embodiment is to equip the apparatus with at least two blades or fingers, at least one of these being fixed, at least one other being rotatable about the rotational axis of the upper set of vanes, these being spaced vertically with a relatively narrow clearance between them. More preferably, there are two series of blades or fingers, one fixed and one rotatable, the blades or fingers of the two series being dispersed vertically with respect to each other such that fixed and rotating fingers alternate. It has been found that this is particularly effective at breaking up large lumps of material such as sodium diacetate.

The apparatus according to this invention has been found to be very useful for dispensing all kinds of powders. However it is particularly good for use in the entraining in gas streams of hygroscopic materials such as sodium diacetate. The quantity of powder entrained in a gas stream can readily be adjusted by regulating the rotational speed of the vanes. The invention therefore also provides a method of entraining a powdery material in a gas stream, comprising adding the powdery material to an apparatus as hereinabove described. The apparatus is useful for entraining powdery material which will be applied to a surface by electrostatic spraying. The apparatus can be used in conjunction with any suitable electrostatic spraying equipment. When hygroscopic powdery material (such as sodium diacetate) is to be sprayed, an especially suitable electrostatic spraying device for use in conjunction with the apparatus of this invention is a spray gun of the type described in Australian patent applications PJ 7231 and PK 2380 both in the name of the present applicant. The invention therefore also provides an electrostatic spray gun of the type described in the abovementioned co-pending patent applications.

The apparatus of this invention is especially useful in the meat preservation process disclosed in PCT Published Application WO 90/03118. The invention therefore also provides a method of preserving meat by spraying on to meat a powdery material which liberates acetic acid in the presence of moisture, the powdery material being entrained in a gas stream prior to spraying by means of an apparatus as hereinabove described.

The invention is now further described with reference to a preferred embodiment as depicted in the accompanying drawings.

Figure 1:
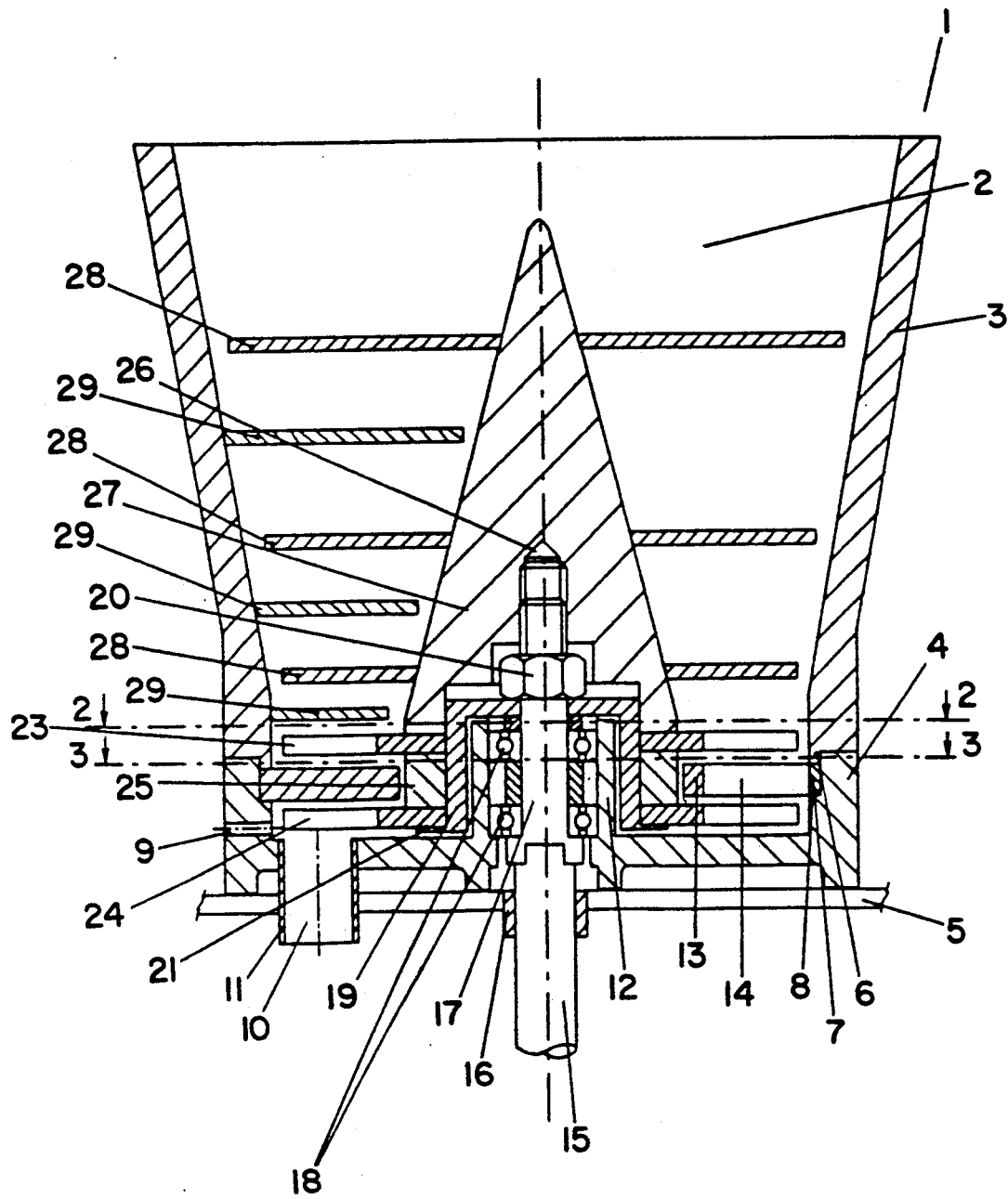
FIG. 1 is a vertical cross-section of a preferred embodiment according to the invention.
Figure 2:
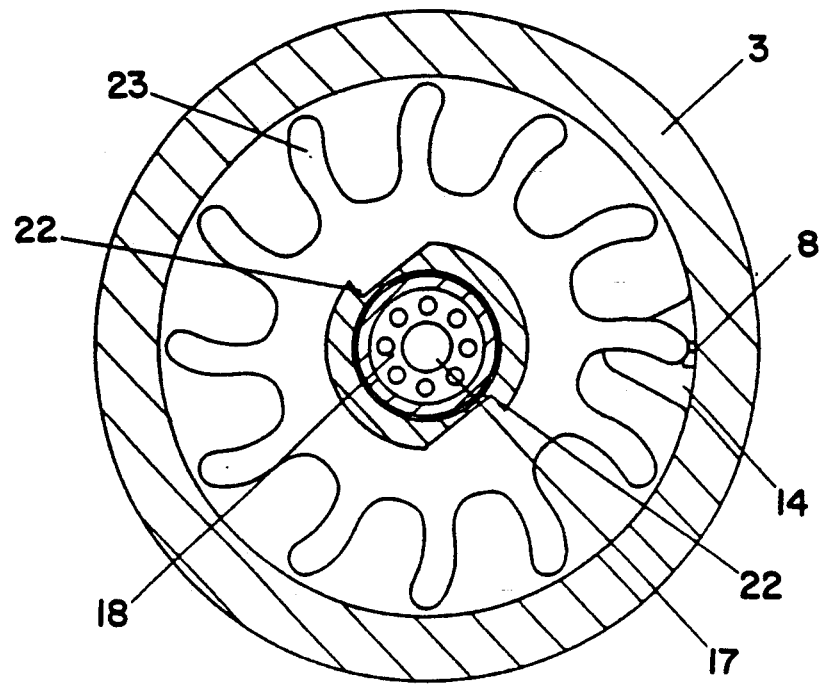
FIG. 2 is a transverse cross-section along the line AA'.
Figure 3:
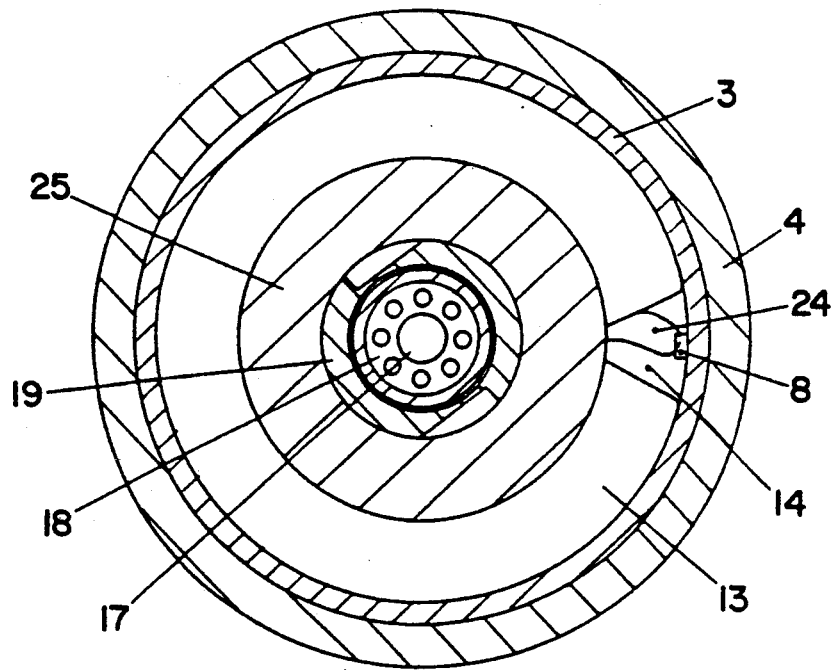
FIG. 3 is a transverse cross-section along the line BB'.

A preferred apparatus basically comprises a stationary member generally designated as 1 and a rotatable member generally designated as 2. The stationary member comprises three major components which give it its external form, a hopper 3 of circular cross section which tapers downwardly, a body portion 4 which has the general form of a hollow cylinder open at its upper end and having a generally flat floor at its lower end, and a base plate 5. The hopper tapers until it is of the same diameter as the body portion and then assumes a cylindrical configuration. The hopper sits on top of the body portion and is located with respect thereto by means of a circumferential lip 6 which runs around the inner edge of that end of the hopper which meets the body portion, the lip being dimensioned such that it protrudes into and mates with the inner cylindrical surface of the body portion to any desired extent. The hopper and the body portion are held together by clamps (not shown). The body portion is in turn held to the base plate by bolts (not shown).

The lower section of the interior of the body portion is of uniformly reduced diameter such that there is defined a circumferential ledge 7. At one point on the upper (non-reduced) diameter interior there protrudes a key 8. Diametrically opposed to this key, there are the following features:
  (a) near the bottom of the cylindrical wall of the body member, a port 9; and
  (b) adjacent to this port and on the floor of the body member, an aperture 10 from which there leads downwardly a conduit 11.

Rising from the floor of the body portion is an axial cylindrical hollow protrusion 12, this being present for the positioning of the rotatable member as will hereinafter be described.

Within the body portion, there sits a stationary plate 13. This has the form of a ring whose outer diameter closely matches the non-reduced diameter of the interior of the body portion. When in position, it sits on the ledge 7. At one edge of the stationary plate is an arcuate re-entrant portion 14, this aligning with the key 8 when the stationary plate is in position. The key prevents the plate from rotating.

The base plate is pierced by an axially-located lower drive shaft 15 which runs in a bush 16 mounted in the base plate. This drive shaft co-operates with a coaxial upper drive shaft 17 which runs in bearings 18 which fit tightly within the cylindrical protrusion 12 of the body portion hereinabove mentioned. To this upper drive shaft is fitted a drive member 19, it being secured in place by a nut 20. This drive member is essentially a hollow member which extends from just above the cylindrical protrusion downwardly to just above the floor of the body portion where it terminates in a circumferential horizontal lip 21. The drive member has the form of a cylinder into the surface of which have been machined two identical sets of two mutually perpendicular flats, one flat being transversely wider than the other and both extending from the top of the drive member to the lip such that the drive member has a uniform cross section between these points. The two sets are orientated such that corresponding flats lie in parallel planes and face in opposite directions. This gives the drive member what are essentially two splines 22 which can communicate drive from upper drive shaft 17 to a co-operating member.

On this drive member are placed two rotors, an upper rotor 23 and a lower rotor 24, these being separated by a spacer 25. The rotors are essentially discs from whose edges extend a series of essentially radial vanes and each rotor has at its disc centre an orifice whose shape matches that of the drive member, thus allowing it to be driven positively and to be removed easily. The space, the drive member and the rotors are dimensioned such that the lower rotor is located just below the stationary plate 13 and the upper rotor just above it.

The upper shaft 17 continues upwardly of the securing nut 20 as a shaft of reduced diameter which terminates in a screw thread 26. This screw thread is the means for securing to the top of the rotatable member a conical member 27 which screws on to this thread and which is made such that it shrouds the shaft and top of the drive member, its open base making contact with the disc of the upper rotor all round the circumference of the base. To the conical member are fitted two series of diametrically opposed horizontal fingers 28 which almost reach the inner walls of the hopper 2. Protruding horizontally from these walls is a set of fingers 29 which nearly reach the conical member and which are disposed vertically so as to lie between the planes of rotation of adjacent fingers 28.

In operation, a material to be entrained in an air stream is fed into the hopper 3. The rotatable member is then caused to rotate. The material is broken up initially by the fingers 28 and 29- these are especially effective at breaking up large lumps. The material then passes to the upper rotor 23 where it is forced to move in the circle described by the vanes. When the material reaches the arcuate re-entrant portion 14, it falls through to the lower rotor 24 where it is again forced to move in a circle. When it reaches the conduit 11, it there encounters a high speed gas stream blowing through port 9 in the direction of conduit 11. This blows the material through the baseplate aperture 10 and into the conduit 11. From this point it may be entrained in a further gas stream, entering the conduit 11 downstream of the aperture 10, and may thus be carried to an application apparatus.

The gas used to entrain the material may be any suitable gas. It may, for example, be air or nitrogen. Where hygroscopic materials are used, the gas may be dry, but it is a particularly valuable feature of the invention that hygroscopic materials can be entrained without the need for the provision of very dry (and relatively expensive) gases.

The skilled person will be able to visualize many constructions and embodiments which vary from the particular construction hereinabove described but which fall within the scope of the invention. For example, a variety of constructions of the various components can be used, all of which would give good results. An embodiment which has been found useful when very hygroscopic powders are being used is a spring-loaded "flicking" device. This is generally pivotally mounted on a horizontal member protruding from the inner surface of the hopper 3 and it hangs vertically into the arcuate re-entrant portion 14 of the plate 12 and through the vanes of upper rotor 23. A spring seeks to maintain the flicking device in a vertical position. Thus, as the rotor turns, the flicking device is forced to pivot with the vanes against the force of the spring until the end of the flicking device reaches the top of the vane forcing it to move, at which point the spring forces it to "flick" back. This helps keep the sticky hygroscopic powder moving.

The claims defining the invention are as follows.

I claim:

1. An apparatus adapted to dispense a powdery material such that it may be entrained in a gas stream, the apparatus comprising:

(a) a receiving member for said powdery material, said receiving member including particle reducing means for reducing particle size of said powdery material;

(b) a container disposed below said receiving member, said container having two sets of vanes which are rotatable in a substantially horizontal plane about a substantially vertical axis of rotation, said sets of vanes being arranged such that they are vertically displaced from each other by a horizontal partition so as to define an upper vane set and a lower vane set, each said vane set defining a circular area upon rotation thereof, said areas at least partially overlapping when viewed from above, said powdery material passing from the upper vane set to the lower vane set through at least one communication conduit disposed in the horizontal partition, said communication conduit being disposed between said upper vane set and said lower vane set, said communication conduit being at most one quarter of said circular area; and (c) a floor disposed below the lower vane set having at least one exit conduit through which said powdery material leaves the container, said exit conduit being disposed beneath said circular area and being at most one quarter of said circular area, the exit conduit being so positioned in relation to the communication conduit that, when viewed from above, there is no overlap of cross-sectional areas thereof.

2. An apparatus according to claim 1, wherein the sets of vanes are of identical size.

3. An apparatus according to claim 1, wherein an entrance of the exit conduit is located beneath said lower vane set and opposite said communication conduit.

4. An apparatus according to claim 1, further comprising a vent, whereby a gas stream enters the apparatus via the vent which is positioned adjacent to the entrance of the exit conduit.

5. An apparatus according to claim 1, wherein, in order to break up material placed in the receiving member into said powdery material prior to its arrival at the upper vane set, said particle reducing means includes a stirring blade which rotates in the receiving member of the upper vane set.

6. An apparatus according to claim 1 wherein, in order to break up material placed in the receiving member into said powdery material prior to its arrival at the upper vane set said particle reducing means includes at least two blades, at least one of said blades being fixed and at least one other blade being rotatable, said blades being spaced vertically with a narrow clearance therebetween.

7. An apparatus according to claim 6, wherein two series of blades are provided, one series being fixed and one series being rotatable, the blades of the two series being disposed vertically with respect to eachother.

* * * * *